United States Patent
Palomba et al.

(10) Patent No.: US 8,657,501 B2
(45) Date of Patent: Feb. 25, 2014

(54) BEARING DEVICE, OIL DISTRIBUTION MECHANISM AND METHOD

(75) Inventors: Sergio Palomba, Florence (IT); Silvio Giachetti, Florence (IT); Alessandro Bacci, Florence (IT)

(73) Assignee: Nuovo Pignone S.p.A., Florence (IT)

( * ) Notice: Subject to any disclaimer, the term of this patent is extended or adjusted under 35 U.S.C. 154(b) by 556 days.

(21) Appl. No.: 12/876,283

(22) Filed: Sep. 7, 2010

(65) Prior Publication Data

US 2011/0069915 A1 Mar. 24, 2011

(30) Foreign Application Priority Data

Sep. 22, 2009 (IT) .............................. CO2009A0032

(51) Int. Cl.
*F16C 17/03* (2006.01)

(52) U.S. Cl.
USPC .............................. 384/311; 384/117; 384/312

(58) Field of Classification Search
USPC .......................... 384/117, 305–309, 311–312
See application file for complete search history.

(56) References Cited

U.S. PATENT DOCUMENTS

| | | | |
|---|---|---|---|
| 2,363,260 A | | 11/1944 | Peskin et al. |
| 3,023,055 A | * | 2/1962 | Thompson ..................... 384/117 |
| 3,131,005 A | * | 4/1964 | Wagley .......................... 384/306 |
| 3,201,184 A | * | 8/1965 | Hill ................................ 384/308 |
| 3,408,122 A | * | 10/1968 | Burger et al. .................. 384/303 |
| 3,572,856 A | | 3/1971 | McHugh |
| 3,791,703 A | | 2/1974 | Ifield |
| 3,887,245 A | | 6/1975 | Rouch |
| 3,891,281 A | | 6/1975 | Jenness |
| 3,985,405 A | * | 10/1976 | Okano et al. .................. 384/117 |
| 4,291,926 A | | 9/1981 | Tomioka et al. |
| 4,322,116 A | * | 3/1982 | Heinemann et al. .......... 384/100 |
| 4,323,286 A | * | 4/1982 | Vohr .............................. 384/317 |
| 4,568,204 A | * | 2/1986 | Chambers ..................... 384/309 |

(Continued)

FOREIGN PATENT DOCUMENTS

| | | |
|---|---|---|
| CA | 1186358 A1 | 4/1985 |
| EP | 0368558 A2 | 5/1990 |
| EP | 1008773 B1 | 6/2000 |
| GB | 05619 A | 0/1914 |

OTHER PUBLICATIONS

EP Patent Application No. 10177343.0-2424, Search Report and Written Opinion, Dec. 6, 2010.

(Continued)

*Primary Examiner* — Marcus Charles
(74) *Attorney, Agent, or Firm* — Global Patent Operation

(57) ABSTRACT

Method, pad and bearing device for oil redistribution. The bearing device includes a ring having at least one retaining head, at least one pad disposed inside the ring and having a bottom recess portion configured to receive the at least one retaining head, an oil distribution mechanism configured to inject oil at a leading edge of the at least one pad to flow towards a trailing edge of the at least one pad, and an oil redistribution mechanism on the at least one pad configured to redistribute the oil from the trailing edge of the at least one pad to the leading edge of the at least one pad. The leading edge is a first edge and the trailing edge is a second edge of the at least one pad encountered when traveling along a circumference of the ring in a direction of rotation of a rotor supported by the at least one pad.

14 Claims, 14 Drawing Sheets

(56) References Cited

U.S. PATENT DOCUMENTS

| | | | |
|---|---|---|---|
| 4,699,524 A * | 10/1987 | Bath | 384/306 |
| 5,288,153 A * | 2/1994 | Gardner | 384/312 |
| 5,360,273 A | 11/1994 | Buckmann | |
| 5,547,287 A * | 8/1996 | Zeidan | 384/117 |
| 5,613,781 A | 3/1997 | Kuzdzal et al. | |
| 5,738,356 A | 4/1998 | Marshall | |
| 5,738,447 A * | 4/1998 | Nicholas | 384/307 |
| 5,743,657 A | 4/1998 | O'Reilly et al. | |
| 6,361,215 B1 | 3/2002 | Wilkes et al. | |
| 6,588,933 B2 * | 7/2003 | Ferguson | 384/122 |
| 6,623,164 B1 * | 9/2003 | Gozdawa | 384/117 |
| 6,736,542 B2 | 5/2004 | Hudson | |
| 7,367,713 B2 | 5/2008 | Swann et al. | |
| 2003/0012468 A1 | 1/2003 | New | |
| 2004/0240759 A1 * | 12/2004 | Swann et al. | 384/309 |
| 2009/0080820 A1 | 3/2009 | Matyscak et al. | |

OTHER PUBLICATIONS

"Low frequency shaft vibration tests and anaylses", DeCamillo et al., 7th EDF & LMS Poiters Workshop: "Operational Limits of Bearings: Improving of Performance through Modeling and Experimentation", Futuroscope. Oct. 2, 2008, pp. H.1-H.12.

Europeen Search Report & Written Opinion issued Dec. 6, 2010 in onnection with corresponding Ep Application No. 10177343.0.

* cited by examiner

BEARING DEVICE, OIL DISTRIBUTION MECHANISM AND METHOD

BACKGROUND

1. Technical Field

Embodiments of the subject matter disclosed herein generally relate to methods and systems and, more particularly, to mechanisms and techniques for redistributing oil to retaining pads within a bearing device.

2. Discussion of the Background

Turbo machinery is evolving and the latest technology in this field is making use of high-speed bearings. In many areas of bearing design, the design of the rotor-bearing system directly influences the performance of the machine. Traditional designs have provided bearings with rolling elements, i.e., pads or shoes that may pivot around a retaining head while supporting a rotor. However, at high speeds and/or high pressures, the load capacities and stiffness limits of the rolling elements are exceeded and thus, the performance and life expectancy of the machinery is reduced. For example, at peripheral speeds above the typical speed for a traditional turbo machinery, ball-bearings placed at the ends of a rotating shaft to accommodate bearing speed limits may lead to super critical operation (i.e., operating above critical speed), which may result in an unstable rotor subject to destructive and unpreventable subsynchronous whirl and to large radial deflections.

While conventional applications of turbo machinery employ a traditional peripheral speed, it appears that a machine that can operate at higher speeds would improve power consumption and heat distribution in pads, among other advantages. However, these higher-than-normal speeds may contribute to other problems that are discussed next.

In order to reduce friction between a rotor and a bearing, oil may be introduced to separate the two components of the machine. In the art, this system is known as a journal bearing. The shaft and bearing are generally both simple polished cylinders with lubricant filling a gap between the shaft end and the shoes of the bearing. Rather than the lubricant just "reducing friction" between the surfaces of the shaft and the shoes, letting one slide more easily against the other, the lubricant is thick enough that, once rotating, the surfaces do not come in contact at all. If oil is used, it is generally fed into a hole in the bearing under pressure, as is done for loaded bearings.

Such an example is shown in FIG. 1, which is an illustration of FIG. 1 of U.S. Pat. No. 6,361,215, the entire content of which is incorporated herein by reference. FIG. 1 shows the journal bearing 10 enclosing a shaft 12 that rotates in a direction as shown by arrow 14. Journal bearing 10 includes five pads 16 that are retained in place by a ring 18. Each pad 16 includes a pad support 20 inserted into a recess region 22 of the pad 16. The pad support 20 is connected to an insert 24 that is fixed to the ring 18. Each pad support 20 and recess region 22 have cooperating spherical surfaces to allow the pad 16 to pivot freely in any direction to conform to the surface of the shaft 12 as it rotates. In addition, the journal bearing 10 has oil supply devices 26 regularly formed inside the ring 18 for supplying the oil between pads 16 and shaft 12.

However, when shaft 12 rotates relative to the pads 16 above a certain speed, oil starvation is one of the problems found in traditional turbo machinery. This problem is exacerbated when the peripheral shaft speed is increased. Oil starvation is the lack of enough oil for the rotating shaft and/or pads such that the oil film between the shaft and the pads is interrupted, which may lead to high friction between the shaft and pads, leading to high temperature and subsequent damage.

In response to this problem, the above noted U.S. Pat. No. 6,361,215 proposes a solution as shown in FIG. 2, which corresponds to FIG. 3 of the patent. FIG. 2 shows a surface 16a of the pad 16 having a leading edge 28a and a trailing edge 28b. The pad 16 has the oil supply devices 26 in flow communication with a groove 30. Thus, the oil is initially provided on the surface 16a in groove 30. From there, the oil is taken by the rotor (while rotating along direction 14) towards the inside of the surface 16a of pad 16. However, as explained by U.S. Pat. No. 6,361,215 at column 5, lines 43-47, the oil is forced from a center of surface 16a towards edges 32a and 32b of the pad 16. To improve an oil distribution on surface 16a, U.S. Pat. No. 6,361,215 proposes adding grooves 34a and 34b on sides of the pad 16, to capture the oil moving from the center of the pad towards edges 32a and 32b for redistributing that oil. Thus, grooves 34a and 34b of U.S. Pat. No. 6,361,215 have two regions, first regions 36a and 36b that are parallel to edges 32a and 32b and second regions 38a and 38b that are angled to facilitate the oil distribution from the side towards the center of pad 16.

However, this method only provides oil redistribution close to the trailing edge 28b, where the second regions 38a and 38b of grooves 34a and 34b are located, and the redistribution takes place from the edges of pad 16 towards the center of pad 16. Thus, the oil redistribution is limited by the geometry of the second regions 38a and 38b. FIG. 3 shows a pressure distribution of the oil across a width W of the pad 16, which illustrates why the oil from the center of surface 16a in FIG. 2 is forced to move towards edges 32a and 32b by the rotation of shaft 12.

Another problem that may appear in traditional turbo machinery is cavitation. Cavitation is the formation of vapor bubbles of a flowing liquid (oil for example) in a region where the pressure of the liquid falls below its vapor pressure. As the rotor rotates at high speed, the pressure of the oil may fall below its vapor pressure, leading to cavitation and formation of shock waves. Since the shock waves formed by cavitation are strong enough to significantly damage moving parts, cavitation is usually an undesirable phenomenon.

As the peripheral shaft speed of new applications requires speeds in excess of predetermined speed, the above summarized problems have to be addressed and solved in order for these applications to function appropriately. While the above problems have been discussed in the context of journal bearings, these problems are found in other bearings in which the shaft rotates relative to the pads at high speeds.

Accordingly, it would be desirable to provide devices, systems and methods that avoid the afore-described problems and drawbacks as well as others understood by those of ordinary skill after consideration of the subject matter disclosed below.

SUMMARY

According to one exemplary embodiment, there is a bearing device that includes a ring having at least one retaining head, at least one pad disposed inside the ring and having a bottom recess portion configured to receive the at least one retaining head, an oil distribution mechanism configured to inject oil at a leading edge of the at least one pad to flow towards a trailing edge of the at least one pad, and an oil redistribution mechanism on the at least one pad configured to redistribute the oil from the trailing edge of the at least one pad to the leading edge of the at least one pad. The leading edge is a first edge and the trailing edge is a second edge of the at least one pad encountered when traveling along a circumference of the ring in a direction of rotation of a rotor supported by the at least one pad.

According to still another exemplary embodiment, there is a pad to be placed in a bearing device. The pad includes a body having a bottom recess portion configured to receive a retaining head of a ring of the bearing device, an oil distribution mechanism configured to inject oil at a leading edge of the pad to flow towards a trailing edge of the pad, and an oil redistribution mechanism on the pad configured to redistribute the oil from the trailing edge of the pad to the leading edge of the pad. The leading edge is a first edge and the trailing edge is a second edge of the pad encountered when traveling along a circumference of the ring in a direction of rotation of a rotor supported by the pad.

According to still another exemplary embodiment, there is a method for forming a redistributing oil mechanism on a pad of a journal bearing configured to support a rotor. The method includes forming, from a side of the pad, a straight conduit inside the pad to extend along a length of the pad, forming first and second channels through a surface of the pad that faces the rotor along a radial direction, which is substantially perpendicular to the length of the pad, the first and second channels being in flow communication with the conduit, and blocking an end of the conduit in flow communication with the side of the pad such that a fluid does not leak out of the conduit.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of journal bearings. However, the embodiments to be discussed next are not limited to these structures and systems, but may be applied to other bearings and systems that include a shaft or rotor that rotates and is supported by pads.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 4:
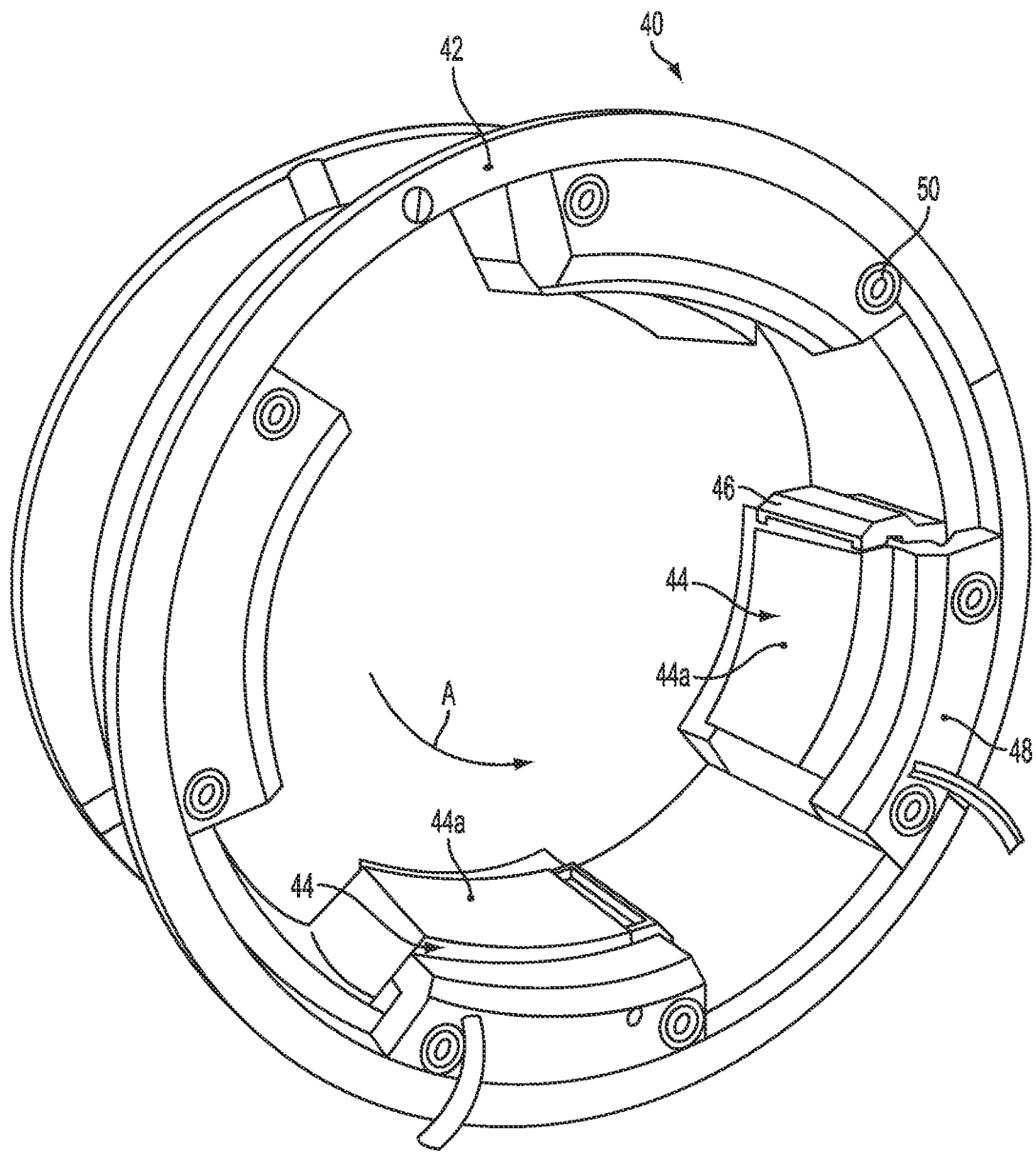
FIG. 4 is a schematic diagram of a journal bearing in a channel and/or groove formed for oil redistribution, according to an exemplary embodiment.

According to an exemplary embodiment shown in FIG. 4, a journal bearing 40 includes a ring 42 that is configured to hold plural pads 44, each having a working surface 44a. The pads 44 are retained by a blocking plate 46 to prevent them from sliding in a rotational direction A when a shaft (not shown) rotates at high speeds (for example between 100 and 170 m/s or higher) in direction A. Corresponding retention plates 48, for preventing axial dislocation, retain the pads 44 in the proximity of ring 42. The retention plates 48 are shown in FIG. 4 as being fixed to the ring 42 by screws 50. In other applications, the retention plates 48 may be fixed by other ways to ring 42, as would be recognized by those skilled in the art. Ring 42, blocking plate 46 and retention plates 48 define a predetermined volume in which pad 44 may pivot about a retaining head (not shown). Details about retaining pad 44 to the ring 42 are discussed, for example, in U.S. patent application Ser. No. xxxx, filed on yyy, entitled "Bearing Device, Retention Mechanism and Method for Retaining at Least One Pad," having the same first author S. Palomba, the entire disclosure of which is incorporated here by reference.

Figure 5:
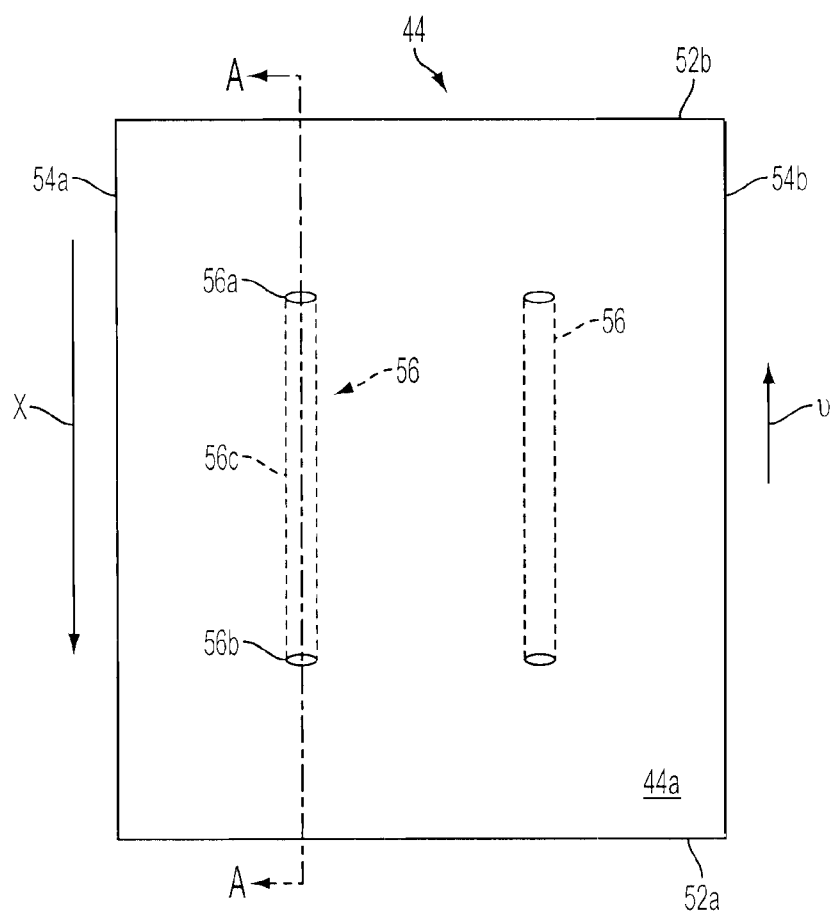
FIG. 5 is a schematic diagram of a surface of a pad having a channel for oil redistribution according to an exemplary embodiment.

According to an exemplary embodiment illustrated in FIG. 5, the surface 44a of the pad 44 may be provided with various grooves and/or channels for promoting oil carry back. To define the process of oil carry back, it is considered that a rotor (not shown in FIG. 5) rotates with a given outer speed v (linear speed of a point on the rotor furthest from a rotational axis of the rotor) and the rotation direction relative to pad 44 is from a leading edge 52a to a trailing edge 52b. Edges of the pad 44 that connect the leading edge 52a to the trailing edge 52b are labeled 54a and 54b. Oil carry over manifests when the oil between the pad 44 and the rotor moves in a direction from the leading edge 52a to the trailing edge 52b. Oil carry back manifests if the oil moves in an opposite direction, i.e., from the trailing edge 52b to the leading edge 52a.

Figure 1:
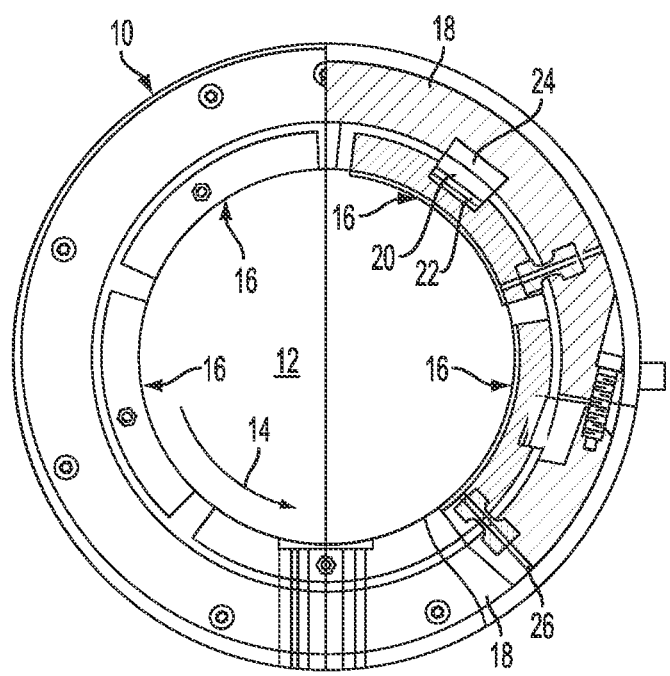
FIG. 1 is a schematic diagram of a conventional journal bearing.
Figure 2:
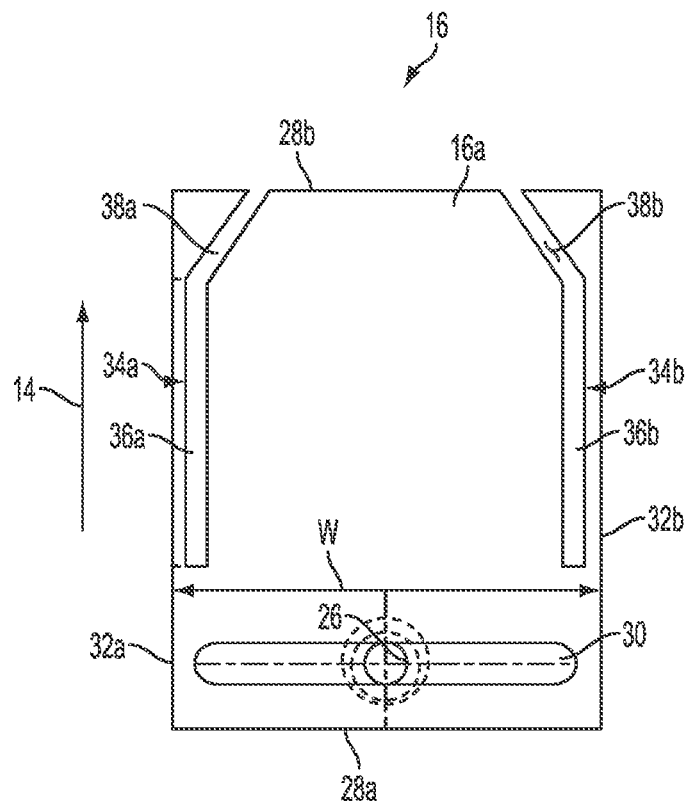
FIG. 2 is an illustration of a surface of a pad of the journal bearing of FIG. 1.
Figure 3:
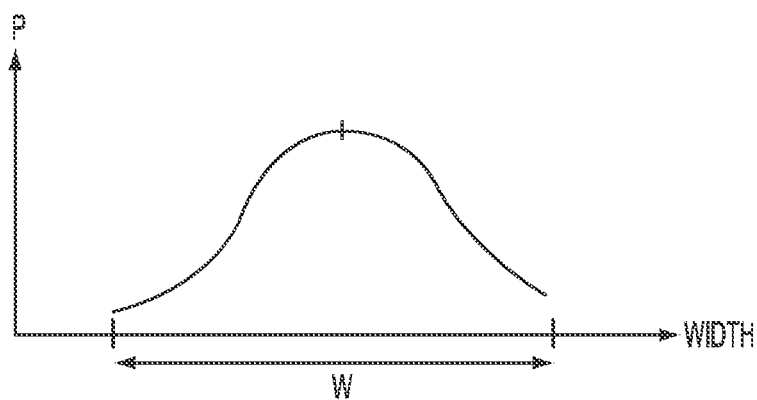
FIG. 3 is a graph of a pressure distribution across a width of the pad of FIG. 2.

FIG. 2 illustrates a conventional pad in which oil carry over was used to redistribute the oil. It is believed that a pad may experience oil carry over when the speed of the rotor relative to the pad is low (less than 70 m/s). However, for higher speeds and for different arrangements of the grooves and or channels, it is believed that oil carry back predominates, as will be discussed next.

Figure 6:
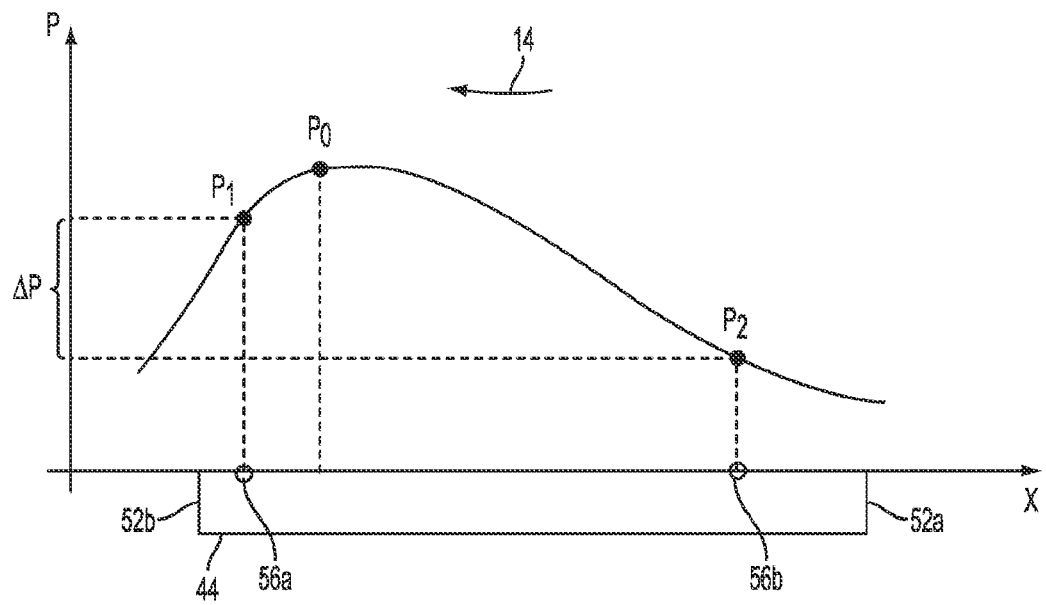
FIG. 6 is graph showing oil pressure distribution across a central region of a pad according to an exemplary embodiment.

FIG. 5 shows an embodiment in which only channels are formed in the pad 44. One channel 56 may include an inlet channel 56a, an outlet channel 56b and a conduit 56c connecting the inlet channel 56a to the outlet channel 56b. It is noted that the inlet channel 56a is provided closer to the trailing edge 52b than the leading edge 52a for the following reason. Although FIG. 5 shows inlet channel 56a and outlet channel 56b at a certain distance from edge 54a, the inlet and outlet channels may be provided closer to the edge 54a or closer to a central portion of pad 44. The inlet channel 56a and outlet channel 56b are shown as having a channel like structure in FIG. 8. A pressure calculated along the channel 56 is shown in FIG. 6. Also shown in FIG. 6 is a slice of the pad 44 (cut along axis X in FIG. 5) along line A-A. It is noted that the pressure is highest at P0, closer to the trailing edge 52b. The pressure P1 at inlet channel 56a is higher than pressure P2 at outlet channel 56b, which is closer to the leading edge 52a. Thus, the pressure difference ΔP between inlet channel 56a and outlet channel 56b determine the oil flow. As long as the inlet and outlet are located on the pad such that their pressure difference is positive, the oil carry back process is achieved.

The pressure curve shown in FIG. 6 depends on many factors, for example, bearing radius, length, thickness of the oil film between the pad and the rotor, viscosity of the oil, etc. Thus, the pressure curve changes from journal bearing to journal bearing and from application to application. However, for a given journal bearing and if the above noted factors are known for that journal bearing, the pressure curve shown in FIG. 6 may be calculated, for example, by using the Reynold's equation. Thus, for the given journal bearing and specified conditions, it is desirable that the inlet channel 56a is located closer to P0 and the outlet channel 56b is located close to P2. However, depending on the application, the inlet channel 56a and the outlet channel 56b are not necessarily matching the high and low pressure points P0 and P2. In one exemplary embodiment, the location of the inlet channel 56a may have a pressure higher than a pressure of the location of the outlet channel 56b in order to promote the flow of oil backwards, i.e., from the trailing edge 52b towards the leading edge 52a. By having this pressure distribution at the channel 56, the oil carry back regime is achieved.

Figure 7:
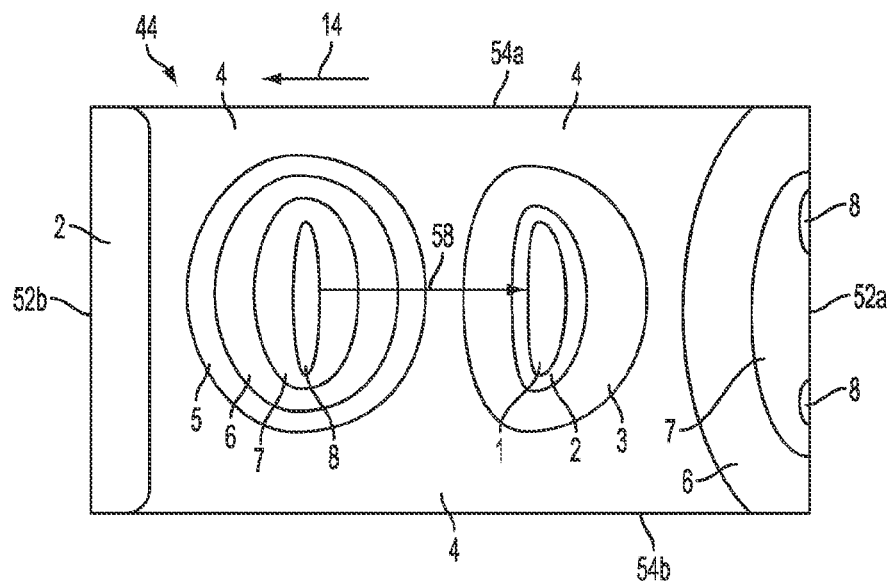
FIG. 7 is an illustration of the oil pressure distribution across a surface of a pad according to an exemplary embodiment.

FIG. 7 illustrates a two-dimensional representation of the calculated pressure of the oil film above pad 44. Labels 1 to 8 represent an arbitrary scale from the highest pressure (8) to the lowest pressure (1). It is noted that in a central region of the pad, the oil will flow from region 8 toward region 1 (see line 58), i.e., oil carry back.

Figure 8:
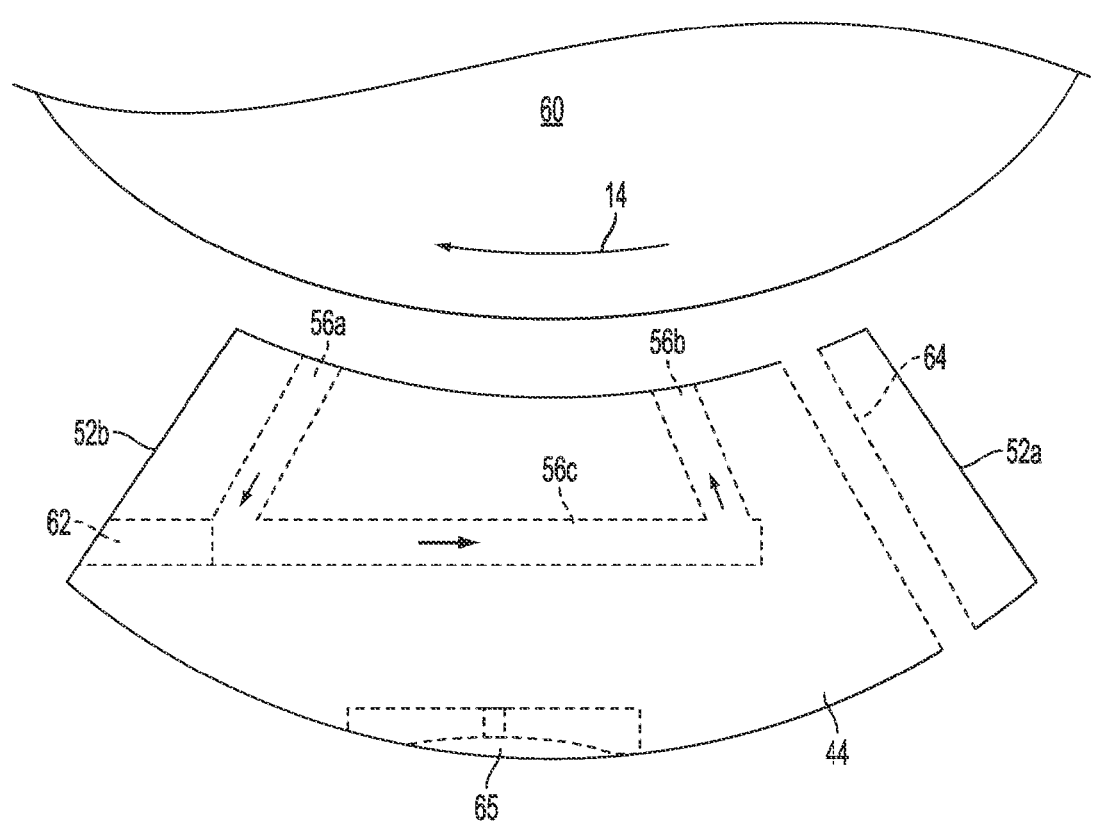
FIG. 8 is a cross section of a pad having a channel according to an exemplary embodiment.

The channel 56, as shown in FIG. 8, may be made by drilling from a side of pad 44 a hole along a straight line to form conduit 56c. FIG. 8 shows a rotor 60 rotating along direction 14 relative to pad 44. Inlet channel 56a and outlet channel 56b may be drilled until the conduit 56c is reached. As shown in this figure, both inlet channel 56a and outlet channel 56b extend from the surface 44a inside the pad 44. Then, a stopper 62 may be screwed, bolted, welded, etc. to an end of the conduit 56c to prevent oil entering inlet channel 56a from exiting pad 44. When functional, oil having a higher pressure at inlet channel 56a than at outlet channel 56b would enter inlet channel 56a, move across conduit 56c and exit outlet channel 56b, thus redistributing the oil across the pad, from the trailing edge towards the leading edge.

This oil "redistribution" mechanism is in addition and different from an oil "distribution" mechanism associated with channel 64, that provides the oil to the pad 44. FIG. 8 shows a retaining head 65 configured to retain pad 44. According to an exemplary embodiment, inlet channel 56a, outlet channel 56b and conduit 56c may each have a 4 mm diameter and conduit 56c may have a length of approximately 10 mm. However, these numbers are illustrative only and they depend on the actual size of the pad, the size and weight of the rotor, etc.

Figure 9:
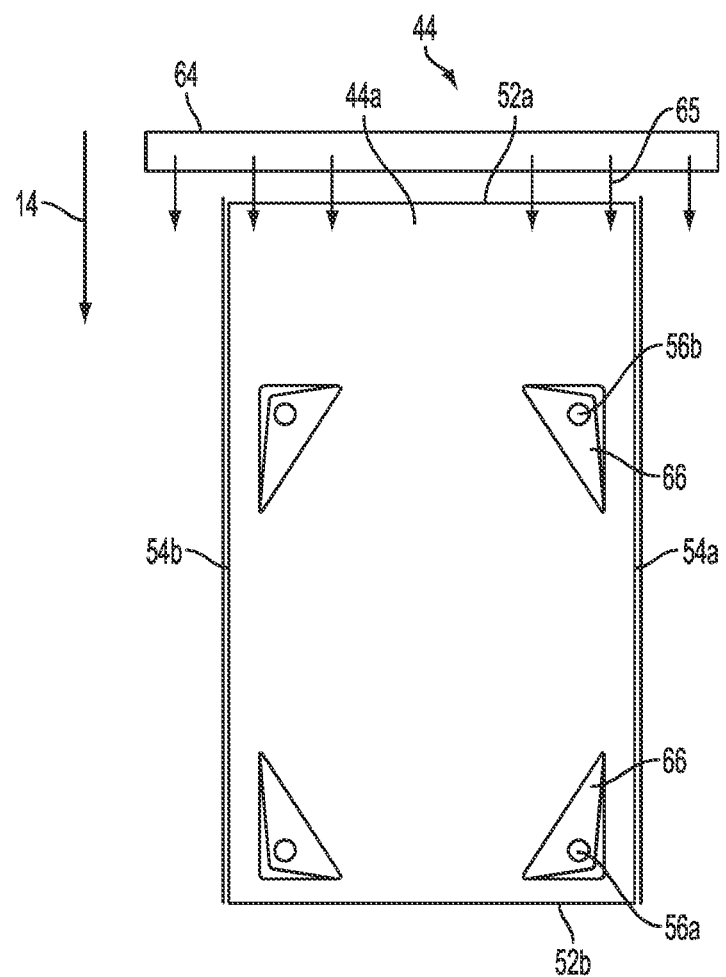
FIG. 9 is an illustration of a surface of a pad having two channels according to an exemplary embodiment.

If two channels 56 are formed on the surface 44a of the pad 44, the distribution of the inlets and outlets may be as shown in FIG. 9, i.e., inlet channels 56a being closer to the trailing edge 52b as compared to the location of outlet channels 56b with respect to the leading edge 52a. In addition, the inlets and/or outlets may be surrounded by a region 66, which has a lower elevation relative to the surface 44a of the pad 44, for storing a small amount of oil at the inlet and/or outlet. Region 66 may be configured to have different shapes as would be recognized by those skilled in the art. FIG. 9 also shows a source of oil 64 and a direction 65 of the flow of oil from the source 64.

According to an exemplary embodiment, the inlet channel 56a and the outlet channel 56b are disposed away from edges 54a and 54b to avoid the potential oil carry over regime for low speeds. Specific distances defining the "disposed away" may vary from application to application and depend on the speed of the rotor and other variables, as will be readily appreciated by those of ordinary skill.

Figure 10:
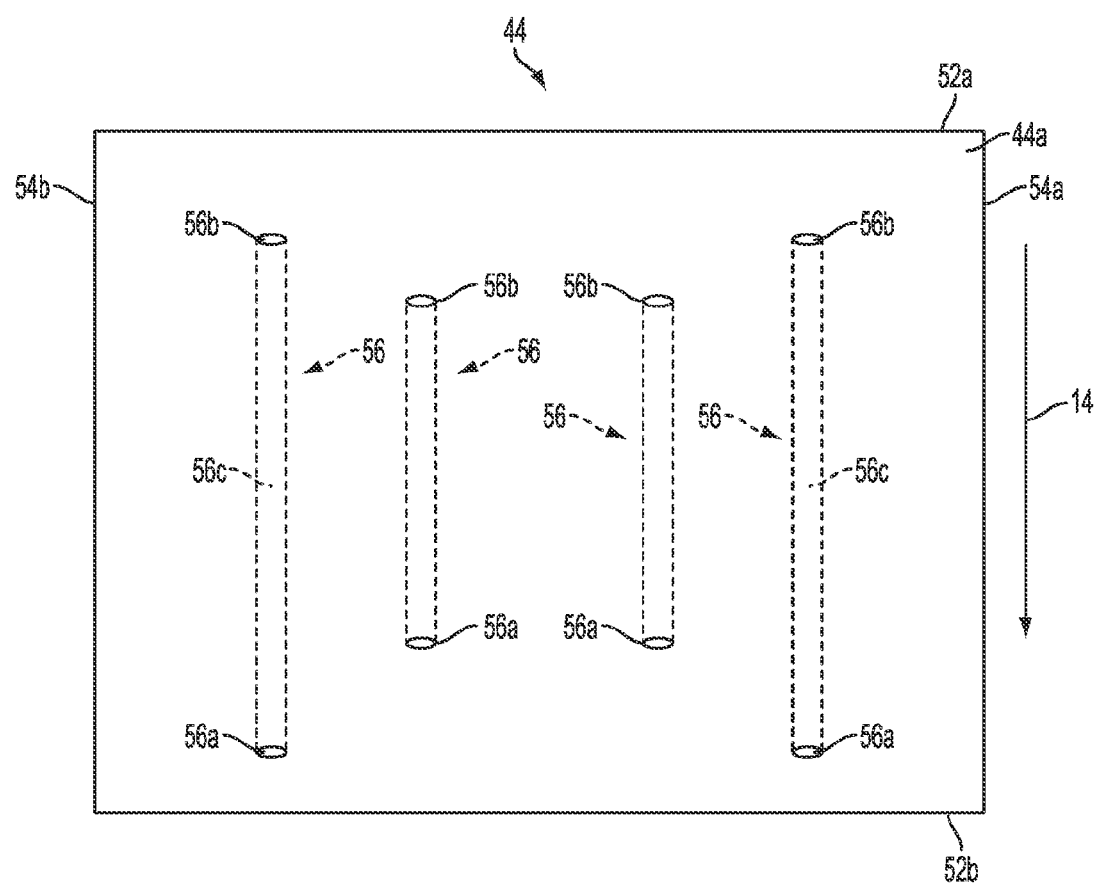
FIG. 10 is an illustration of a surface of a pad having multiple channels according to an exemplary embodiment.

According to an exemplary embodiment shown in FIG. 10, the pad may have a combination of more than two channels 56. Some channels 56 may be formed close to a central region of the pad 44 and some channels 56 may be formed close to edges 54a and 54b. Also, in one application, the length of regions 56c for various channels 56 is different so as to more uniformly cover the pad area 44a.

Figure 11:
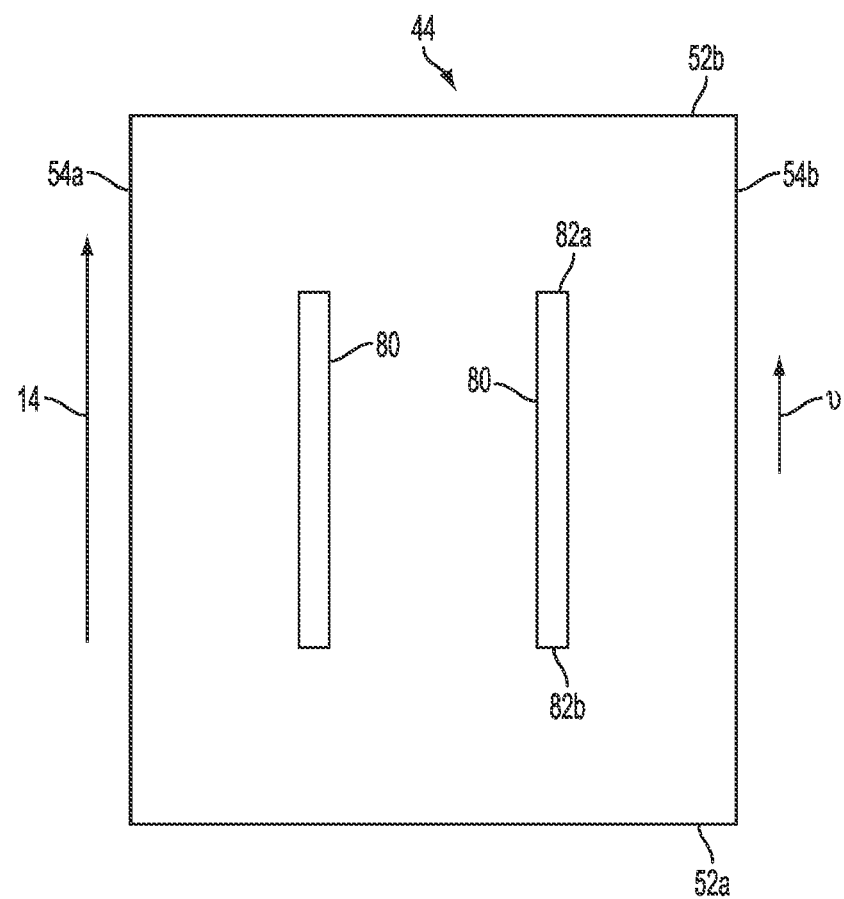
FIG. 11 is an illustration of a surface of a pad having grooves for oil redistribution according to an exemplary embodiment.

According to an exemplary embodiment shown in FIG. 11, instead of having channels 56 with a conduit formed entirely under surface 44a of the pad 44, grooves 80 may be formed between points of high and low pressures on the surface 44a. Each groove 80 has a first end 82a disposed closer to the trailing edge 52b than a second end 82b, and oil present at the end 82a, due to the higher pressure, is forced to travel towards a second end 82b, where the pressure is lower. Grooves 80 may also achieve oil carry back if the grooves are located such that an oil pressure at end regions 82a is higher than an oil pressure at end regions 82b.

Figure 12:
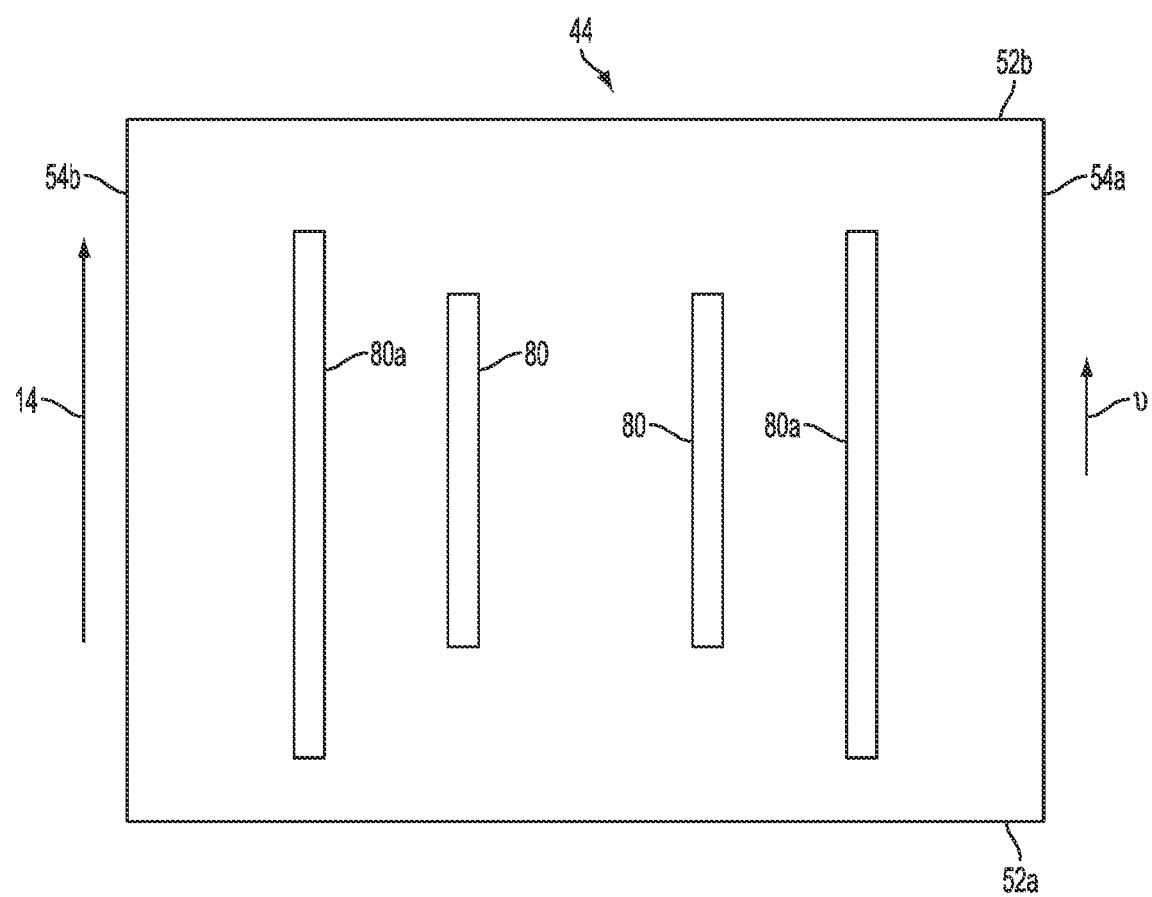
FIG. 12 is an illustration of a surface of a pad having plural grooves according to an exemplary embodiment.

According to an exemplary embodiment, grooves 80 are formed such that neither ends 82a and 82b communicate with edges 52a and 52b. It is believed that such differences between grooves 80 and grooves 36a and 36b shown in FIG. 2 determine different oil flow regimes, i.e., oil carry back regime for grooves 80 (FIG. 11) and oil carry over regime for grooves 36a and 36b. Also, grooves 80a may be formed as close as possible to edges 54a and 54b as shown in FIG. 12. In one embodiment as shown in FIG. 12, it is possible to have a combination of grooves 80 formed closer to a central region of the pad and grooves 80a closer to edges of the pad. A length of the plural grooves does not have to be the same for all grooves. In one application, each groove has a length different from the other grooves or pairs of grooves have a same length and different from other pairs of grooves as also shown in FIG. 12.

Figure 13:
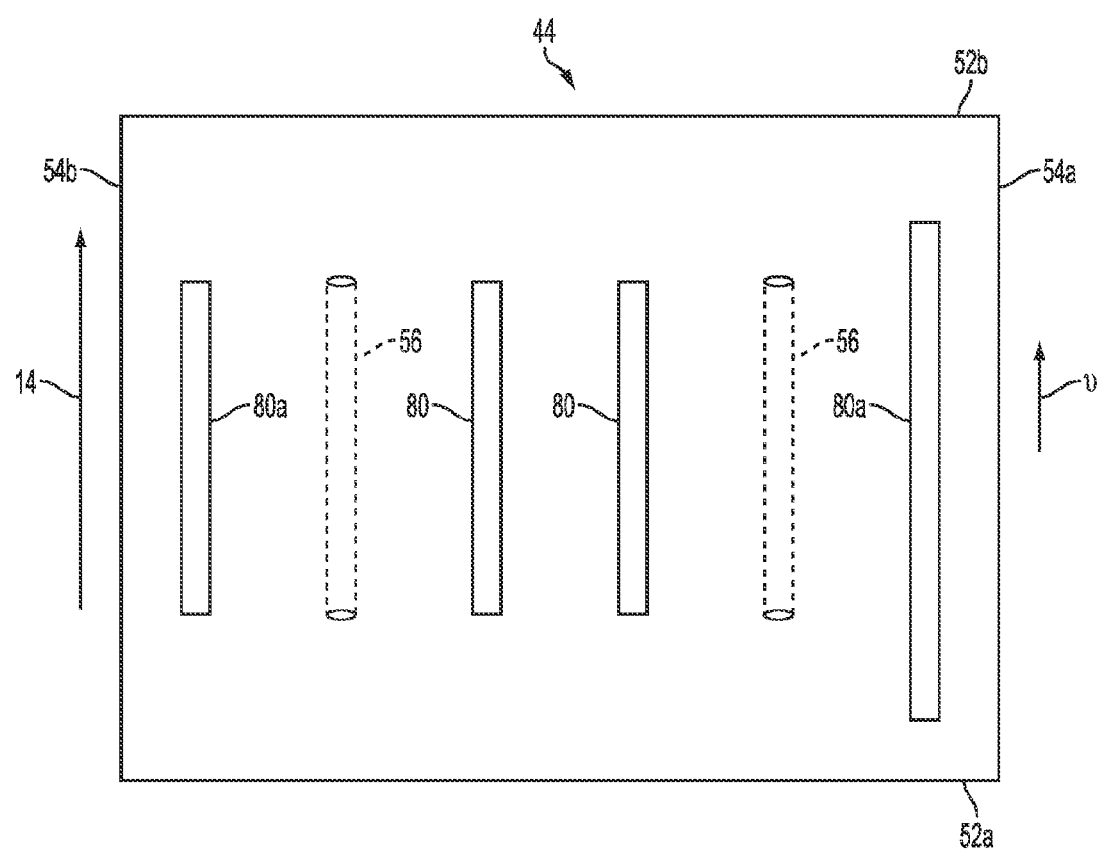
FIG. 13 is an illustration of a surface of a pad having channels and grooves according to an exemplary embodiment.

In an exemplary embodiment as shown in FIG. 13, the surface 44a of pad 44 may include channels 56, grooves 80 and grooves 80*a* and 80*b*. It is possible in one application to have the channels 56 and grooves 80 and 80*a* disposed in different orders, i.e., groove 80*a*, channel 56, groove 80, channel 56, groove 80, groove 80*a*, or other orders as will be recognized by those skilled in the art. Also, it is possible to have grooves 80 superimposed on channels 56, both of them having the same lengths or different lengths.

Figure 14:
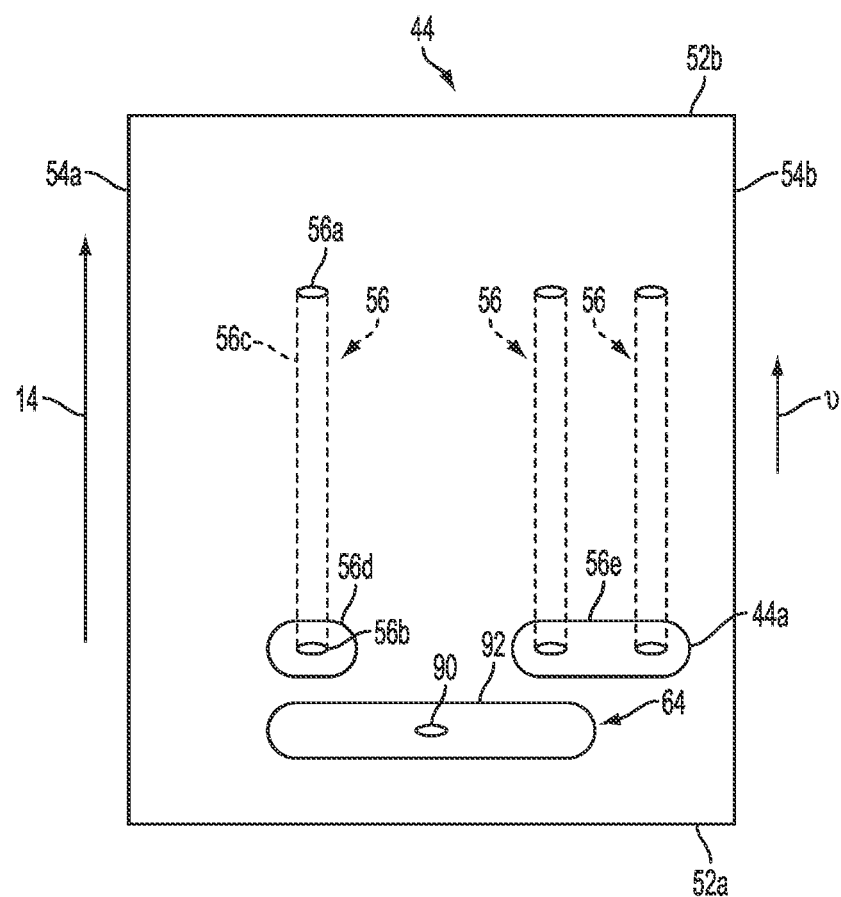
FIG. 14 is an illustration of a pad having channels for oil carry back according to an exemplary embodiment.

In an exemplary embodiment shown in FIG. 14, the oil distribution system 64 is illustrated in more details. An outlet 90 is configured to supply oil to a groove 92, that extends from one edge 54*a* to another edge 54*b*, i.e., substantially perpendicular to conduit 56*c* of channels 56. Groove 92 is configured to accumulate oil from outlet 90 and to distribute it as widely as possible on the surface 44*a* of the pad 44. In another exemplary embodiment, the outlet channels 56*b* of channels 56 may be provided with a corresponding groove 56*d* for accumulating the oil received from inlet channel 56*a* and distributing it more uniformly back to the surface 44*a* of pad 44. According to still another exemplary embodiment, the outlets of two or more channels 56 may be connected by a same groove 56*e* as shown in FIG. 14. The number of channels 56 and/grooves 80 may vary from application to application, but is preferred to be in the range of 2 to 4.

Figure 15:
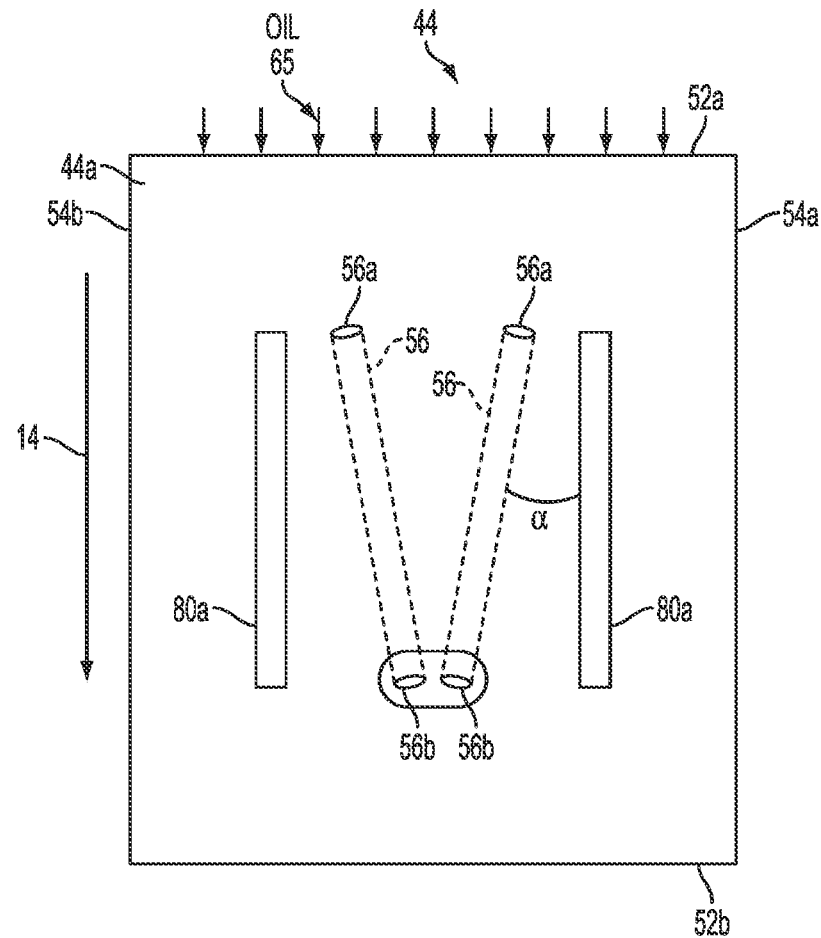
FIG. 15 is an illustration of a pad having channels not parallel to grooves according to an exemplary embodiment.

According to another embodiment as shown in FIG. 15, the channels 56 may not be parallel (i.e., make an angle α less than 90 degrees, more preferably 45 degrees or less) to the grooves 80*a* or among themselves. In another application, the grooves 80 and/or grooves 80*a* may not be parallel to the edges 54*a* and 54*b*.

One advantage of one or more of the exemplary embodiments discussed above is that the oil is redistributed without the need of an external power source, thus reducing oil starvation on the pads.

Figure 16:
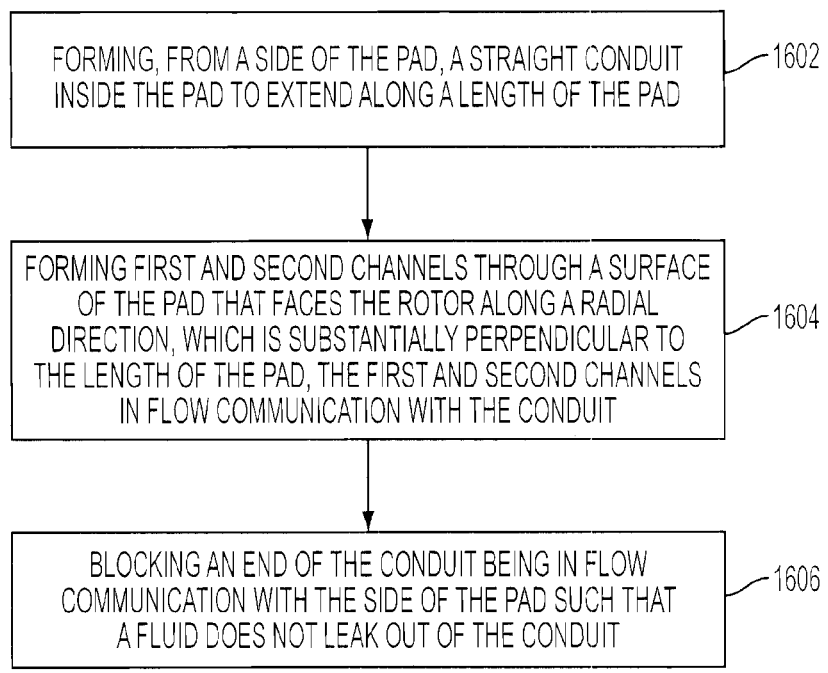
FIG. 16 is a flow chart illustrating steps of a method for forming an oil redistributing mechanism in a pad according to an exemplary embodiment.

According to an exemplary embodiment illustrated in FIG. 16, there is a method for forming a redistributing oil mechanism on a pad of a journal bearing configured to support a rotor. The method includes a step 1602 of forming, from a side of the pad, a straight conduit inside the pad to extend along a length of the pad; a step 1604 of forming first and second channels through a surface of the pad that faces the rotor along a radial direction, which is substantially perpendicular to the length of the pad, the first and second channels being in flow communication with the conduit; and a step 1606 of blocking an end of the conduit in flow communication with the side of the pad such that a fluid does not leak out of the conduit.

The disclosed exemplary embodiments provide a bearing device and a pad having a redistribution oil mechanism. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other example are intended to be within the scope of the claims if they have structural elements that do not differ from the literal language of the claims, or if they include equivalent structural elements within the literal languages of the claims.

What is claimed is:

1. A bearing device, comprising:
a ring having at least one retaining head;
at least one pad disposed inside the ring and having a bottom recess portion configured to receive the at least one retaining head;
an oil distribution mechanism configured to inject oil at a leading edge of the at least one pad to flow towards a trailing edge of the at least one pad;
an oil redistribution mechanism on the at least one pad configured to redistribute the oil from the trailing edge of the at least one pad to the leading edge of the at least one pad;
at least one input channel formed through a surface of the at least one pad, closer to the trailing edge than to the leading edge;
at least one output channel formed through the surface of the at least one pad, closer to the leading edge than to the trailing edge, and
a conduit configured to connect the at least one input channel to the at least one output channel, the conduit being formed entirely under the surface of the at least one pad;
wherein the leading edge is a first edge and the trailing edge is a second edge of the at least one pad encountered when traveling along a circumference of the ring in a direction of rotation of a rotor supported by the at least one pad.

2. The bearing device of Claim; 1, wherein the entire conduit extends along a single straight line.

3. The bearing device of claim 1, wherein the at least one input channel, the at least one output channel and the conduit are aligned along a central region of the at least one pad.

4. The bearing device of claim 1, wherein the oil redistribution mechanism further comprises:
at least one groove formed substantially parallel to the conduit on the surface of the at least one pad.

5. The bearing device of Claim 1, further comprising:
a groove extending axially along the at least one pad and configured to fluidly communicate with the oil redistribution mechanism.

6. The bearing device of claim 1, wherein the oil redistribution mechanism comprises:
at least one groove in the surface of the at least one pad configured to extend along a circumferential direction of the ring, from the leading edge towards the trailing edge but without being in flow communication with either the leading edge or the trailing edge such that the at least one groove promotes an oil carry back and not an oil carry over,
wherein the oil carry back includes transferring oil from the trailing edge to the leading edge and the oil carry over includes transferring oil from the trailing edge to a next pad.

7. The bearing device of claim 6, wherein the oil redistribution mechanism further comprises:
at least an input channel formed through a surface of the at least one pad, closer to the trailing edge than to the leading edge;

at least an output channel formed through the surface of the at least one pad, closer to the leading edge than to the trailing edge; and a conduit configured to connect the at least an input channel to the at least an output channel, the conduit being formed entirely under the surface of the at least one pad.

8. The bearing device of claim 6, wherein the entire at least one groove extends along a single straight line.

9. The bearing device of Claim 6, wherein the conduit makes an angle less than 90 degrees with the at least one groove.

10. A pad to be placed in a bearing device, the pad comprising:

a body having a bottom recess portion configured to receive a retaining head of a ring of the bearing device;

an oil distribution mechanism configured to inject oil at a leading edge of the pad to flow towards a trailing edge of the pad;

an oil redistribution mechanism on the pad configured to redistribute the oil from the trailing edge of the pad to the leading edge of the pad;

at least an input channel formed through a surface of the pad, closer to the trailing edge than to the leading edge;

at least an output channel formed through the surface of the pad, closer to the leading edge than to the trailing edge; and a conduit configured to connect the at least an input channel to the at least output channel, the conduit being formed entirely under the surface of the pad;

wherein the leading edge is a first edge and the trailing edge is a second edge of the pad encountered when traveling along a circumference of the ring in a direction of rotation of a rotor supported by the pad.

11. The pad of claim 10, wherein the entire conduit extends along a single straight line.

12. The pad of claim 10, wherein the at least one input channel, the at least one output channel and the conduit are aligned along a central region of the pad.

13. The pad of claim 10, wherein the oil redistribution mechanism further comprises:

at least one groove formed substantially parallel to the conduit on the surface of the pad.

14. The pad of claim 10, wherein the oil redistribution mechanism comprises:

at least one groove on the surface of the pad configured to extend along a circumferential direction of the ring, from the leading edge towards the trailing edge but without being in flow communication with either the leading edge or the trailing edge such that the at least one groove promotes an oil carry back and not an oil carry over, wherein the oil carry back includes transferring oil from the trailing edge to the leading edge and the oil carry over includes transferring oil from the trailing edge to a next pad.

* * * * *